(12) United States Patent
Passon et al.

(10) Patent No.: US 11,756,512 B2
(45) Date of Patent: Sep. 12, 2023

(54) SYSTEMS AND METHODS FOR UPDATING AN IMAGE DISPLAYED ON A DISPLAY DEVICE

(71) Applicant: Snap Inc., Santa Monica, CA (US)

(72) Inventors: Edmund Passon, Scottsdale, AZ (US); Ian Kyles, West Linn, OR (US); Aaron Boyce, Tigard, OR (US); Glen Sands, Santa Monica, CA (US)

(73) Assignee: Snap Inc., Santa Monica, CA (US)

(*) Notice: Subject to any disclaimer, the term of this patent is extended or adjusted under 35 U.S.C. 154(b) by 0 days.

(21) Appl. No.: 17/791,396

(22) PCT Filed: Jan. 8, 2021

(86) PCT No.: PCT/US2021/012678
§ 371 (c)(1),
(2) Date: Jul. 7, 2022

(87) PCT Pub. No.: WO2021/142243
PCT Pub. Date: Jul. 15, 2021

(65) Prior Publication Data
US 2023/0034839 A1 Feb. 2, 2023

Related U.S. Application Data

(60) Provisional application No. 62/958,627, filed on Jan. 8, 2020.

(51) Int. Cl.
*G09G 5/393* (2006.01)
*G09G 5/395* (2006.01)

(52) U.S. Cl.
CPC ............ *G09G 5/393* (2013.01); *G09G 5/395* (2013.01); *G09G 2310/04* (2013.01)

(58) Field of Classification Search
CPC ... G06F 9/3881; G06F 9/30043; G09G 5/395; G09G 5/393; G09G 2310/04; G09G 3/2983; G09G 2300/0439
See application file for complete search history.

(56) References Cited

U.S. PATENT DOCUMENTS

| 6,078,316 A | 6/2000 | Page et al. |
| 10,950,305 B1 * | 3/2021 | Seiler ........................ G09G 5/39 |

(Continued)

FOREIGN PATENT DOCUMENTS

| CN | 115053208 A | 9/2022 |
| TW | 202143022 A | 11/2021 |
| WO | WO-2021142243 A1 | 7/2021 |

OTHER PUBLICATIONS

"International Application Serial No. PCT/US2021/012678, International Search Report dated May 18, 2021", 7 pgs.

(Continued)

*Primary Examiner* — Antonio A Caschera
(74) *Attorney, Agent, or Firm* — SCHWEGMAN LUNDBERG & WOESSNER, P.A.

(57) ABSTRACT

A system for updating an image on a display device includes pixels in a pixel array. The system includes a display subsystem for executing commands and displaying images, the display subsystem also includes a parser for receiving image frame data, and extracting updated image data and commands. A storage device is used for storing the updated image data in an updated cache location according to the commands. A loader is used for reading the commands to identify and fetch the updated image data from the storage device. Display backplane circuitry is used for receiving the updated image data from the loader and for updating pixel driver circuity for pixels within the updated image data. The (Continued)

examples described are ideal for driving micro-displays such as LCoS micro-LED displays.

20 Claims, 5 Drawing Sheets

(56)　　　　　　References Cited

U.S. PATENT DOCUMENTS

| | | |
|---|---|---|
| 2003/0107579 A1 | 6/2003 | Willis et al. |
| 2012/0146963 A1* | 6/2012 | Kim .................... G09G 3/3648 345/204 |
| 2012/0188272 A1* | 7/2012 | Wang .................... G09G 3/344 345/629 |
| 2015/0206281 A1* | 7/2015 | Takada .................. G09G 5/393 345/666 |
| 2017/0221182 A1 | 8/2017 | Cawley et al. |
| 2017/0287384 A1 | 10/2017 | Lee et al. |

OTHER PUBLICATIONS

"International Application Serial No. PCT/US2021/012678, Invitation to Pay Additional Fees dated Mar. 26, 2021", 16 pgs.
"International Application Serial No. PCT/US2021/012678, Written Opinion dated May 18, 2021", 16 pgs.
"International Application Serial No. PCT/US2021/012678, International Preliminary Report on Patentability dated Jul. 21, 2022", 18 pgs.

* cited by examiner

SYSTEMS AND METHODS FOR UPDATING AN IMAGE DISPLAYED ON A DISPLAY DEVICE

RELATED APPLICATIONS

This application is a U.S. National Stage Filing under 35 U.S.C. 371 from International Application No. PCT/US2021/012678, filed on 8 Jan. 2021, and published as WO 2021/142243 on 15 Jul. 2021, which application claims the benefit of U.S. Provisional Application No.: 62/958,627, filed on Jan. 8, 2020, the entire content of which are incorporated herein by reference.

FIELD OF THE DISCLOSURE

The present disclosure relates to displays. More particularly, the disclosure relates to updating an image displayed on a display device, such display device including spatial light modulators and/or displays such as liquid crystal displays, liquid crystal-on-silicon (LCoS) displays, LED displays, microLED displays and micro displays that are driven with display driver circuitry and/or software (e g., circuitry, logic components or circuitry, ICs, and/or drive software).

BACKGROUND OF THE DISCLOSURE

In mobile systems such as Augmented Reality (AR) Head-Mounted Displays, power dissipation and battery usage are of paramount importance. In these systems, the generation (rendering) of video data on the host (e.g., video source such as a, phone, computer, tablet or other mobile device), the transport (over cables, for instance) of said data and processing/loading of said video data in the display driver IC and backplane IC or ICs all consume power for each bit transmitted or toggled in each bit of hardware in the pipeline. These systems send over an entire frame of data including both unchanged and changed data, to be displayed, from the frame buffer of the host. For example, some systems may only render changing portions of the image being displayed and write them to a frame buffer on the host, but then send the entire frame to the display subsystem. In addition, these systems also employ a fixed refresh rate. Due in part to this duplication and the waste of power dedicated to data transport through the system, known techniques and conventional systems are currently deficient in providing light weight, long-use systems that also minimize battery weight and volume.

Such, known display systems having a data source or host for rendering image frame data, render and transmit an entire image frame data from a frame buffer for updating a currently displayed image of an entire display. This includes sending over duplicative or unchanged data between two image frames. The data may be, for example, video, images or image data that characterizes the image. The display may be a micro display such as an LCD or LCoS microdisplay, or a direct view larger display.

BRIEF SUMMARY OF THE DISCLOSURE

In an embodiment of the present disclosure, there is provided a display system for updating an image displayed on a display device, said display device comprising pixels in a pixel array, said system comprising: a display subsystem for executing commands, wherein the commands instruct the display subsystem how to update the display, said display subsystem comprising; a parser for receiving the image frame data, wherein the parser extracts updated image data and the commands; a storage device for storing the updated image data in a updated cache location according to the commands; a loader for reading the commands to identify and fetch the updated image data from the storage device; and display backplane circuitry for receiving the updated image data from the loader and for updating pixel driver circuity for pixels within the updated image data.

In an embodiment of the present disclosure, there is provided a method of updating an image displayed on a display device, said display device comprising pixels in a pixel array, said method comprising the steps of: receiving image frame data in a display subsystem; receiving the image frame data in a parser extracting updated image data and the associated commands from the image frame data, said image frame data comprising commands instructing a loader how to update the display; storing the updated image data in an updated cache location according to the commands; reading the commands to identify and fetch the updated image data from the updated cache location; receiving the updated image data from the loader; and updating pixel driver circuity for pixels only within the updated image data.

In an embodiment of the present disclosure, the storage device may comprise a cache memory. The cache or storage device may be physical memory, such as RAM, EEPROM or the like, or may be software based cache memory or storage.

In an embodiment of the present disclosure, there is provided a display system for updating an image displayed on a display device, said display device having a display comprising pixels in a pixel array, said system comprising: a display subsystem for executing commands, wherein the commands include: instructions for the display device describing how to update the display from updated image frame data, said display subsystem comprising a parser for receiving the updated image frame data, wherein the parser extracts updated image data and the commands; instructions for a storage device describing how to store the updated image data in a updated cache location; instructions for a loader describing how to identify and fetch the updated image data from the cache location; and display backplane circuitry for receiving the updated image data from the loader and for updating pixel driver circuity for pixels within the updated image data.

In a system in accordance with an embodiment of the present disclosure, the display backplane portion only reloads data into a portion of the display while leaving the state of all other pixels static. This is achieved by making the display load its pixels by addressing groupings of pixels, for example, small rectangular blocks of pixels or subsets of the display's pixels, or collections of blocks of pixels or subsets of the display's pixels, by utilizing one or more column-oriented load enable signals (for example, control voltages that activate or deactivate (enable or disable) the pixel groupings) for each group of columns defining the horizontal range of columns in the block 308 that works in conjunction with the row-oriented load signals (e.g., control voltages) to enable or disable loading new data into pixels within the blocks of pixels 308.

In an embodiment of the present disclosure a display system for updating an image displayed on a display device, said display device may include pixels in a pixel array, and said system includes a display subsystem for executing commands, wherein the commands instruct a loader how to update the display, said display subsystem comprising; a parser for receiving the image frame data, wherein the parser extracts updated image data and the commands including commands that identify the portions of the display to be updated or not; a map consisting of a collection of data, wherein the collection of data includes at least one of coordinates and block locations (for example coordinates of locations in the display or locations of pixel or pixel elements of a display or locations or coordinates of blocks of pixels or pixel elements in a display, or locations in a corresponding image or image data) that indicate the areas of the display that are active and need to be updated; a storage device for storing the updated image data in the storage device, an updated storage location, or cache, according to the commands which can, for example, selectively store or determine where incoming data will be stored based on the contents of the map; a loader for reading the commands to identify and fetch the updated image data from the storage device, updated storage location, or cache, and which can selectively fetch the data according to the map; and display backplane circuitry for receiving the updated image data from the loader and for updating pixel driver circuitry for pixels within the updated image data. In an embodiment of the present disclosure, a display system for updating an image displayed on a display device, said display device comprising pixels in a pixel array, said system includes a parser for receiving image frame data, wherein the parser extracts updated image data and the commands including commands that identify portions of the display for updating; a map consisting of a collection of data, wherein the collection of data includes at least one of coordinates and block locations of the active areas of the display for updating; a storage device for storing the updated image data based on at least one of the commands and the map; a loader for reading the commands, and wherein the loader identifies the updated image data, and fetches the updated image data from the storage in accordance with the map; and display backplane circuitry for receiving the updated image data from the loader and for updating pixel driver circuitry that updates the pixels with the updated image data.

In an embodiment, the commands comprise a descriptor identifying which location of the corresponding portion of the image the updated image data shows. In an embodiment, the parser at least one of sends the commands to the storage device and/or the loader. In an embodiment, the loader reads the descriptor and fetches the updated image data from the updated storage location. In an embodiment, the loader identifies pixel rows and/or columns in the pixel array corresponding to the location in the descriptor. In an embodiment, the loader queues reading of the descriptor until the loader fetches data from the storage device. In an embodiment, the loader queues reading of the descriptor to occur at predetermined intervals. In an embodiment, the system further includes an image source, and wherein the image source identifies the location of the display to be updated, and renders updated image data only for the location. In an embodiment, the image source is a video data source, and wherein the updated image data is stored in at least one of a memory and buffer. In an embodiment, the at least one of a memory and a buffer is a buffer and the updated image dated stored in the buffer is transmitted to the display system, and wherein the display system comprises driver display logic for computing an occupancy map of active areas of the display from the updated image data. In an embodiment, the areas of the display comprise rectangular tiles of at least one of pixels, rows of pixels, and portions of the pixels of the display. In an embodiment, the occupancy map determines active areas by analyzing whether or not there are any non-black pixels in areas of the display. In an embodiment, only data that is non-black is written into the storage device. In an embodiment, only updated image data corresponding to active areas of the display is retrieved from the storage device. In an embodiment, the display system comprises an array of pixels, and each pixel within the pixel array comprising pixel comprises pixel elements coupled to pixel logic circuitry; and pixel memory coupled to pixel logic circuitry. In an embodiment, the storage elements store the current grayscale value of the pixel. In an embodiment, the pixels further comprises pixel drive circuitry. In an embodiment, the pixel logic circuitry decodes the current grayscale value and modulate the pixel drive circuitry and generates at least one of a pixel intensity and brightness. In an embodiment, the memory elements comprise latch circuity to store image data represented by a number of bits, for the pixel. In an embodiment, the system further includes an image source, wherein said image source at least one of renders and transmits said image frame data, the image frame data comprising: updated image data of at least a portion of an image to replace a corresponding portion of image data of a currently displayed image; and associated commands describing how the updated image data replaces the image data. In an embodiment, the storage device is a cache memory. In an embodiment, a method of updating an image displayed on a display device, said display device comprising pixels in a pixel array includes the steps of: receiving image frame data in a display subsystem; receiving the image frame data in a parser extracting updated image data and the associated commands from the image frame data, said image frame data comprising commands instructing a loader how to update the display; storing the updated image data in an updated cache location according to the commands; reading the commands to identify and fetch the updated image data from the updated cache location; receiving the updated image data from the loader; and updating pixel driver circuitry for pixels only within the updated image data.

The devices, systems and methods of the present disclosure save power within a display system by optimizing the rendering, transporting and refreshing of data (e.g., video, images, video/image data). The embodiments of the disclosure herein allow one to change, at every stage only what is changing, i.e., selectively refreshing only the portions of the data that need to change relative to the entire previous frame or sub-frame and only those portions that are non-blank. As such, only these changing or active portions are rendered, transported and refreshed, while the other portions of an image or image data remain the same or are not changed by the display driver circuitry and/or software. This selective refresh may occur at one or more stages of the pipeline, namely during host rendering, transport, and/or updating of the display, according to the embodiments herein.

As a result of the minimization of the amount of data sent and subsequently the amount of data processed, transported and refreshed at multiple stages of the pipeline (e.g., the complete video frame is not sent), the overall system increases efficiency, and reduces battery size and power consumption in associated devices that utilize such display systems and methods. These savings (e.g., smaller batteries and smaller/lighter mobile systems) are ideal for applications that require longer battery life such as head-mounted systems, including AR, VR and the like. Further, embodiments herein are ideal for driving displays, for example, liquid crystal displays, LCoS displays, LED displays, micro-LED displays. In an embodiment of the present disclosure, the display driver circuitry and/or software may be integrated, included, or coupled to a display, to form, for a single device (e.g., a display device with a silicon backplane (display device may be bonded or otherwise coupled to the backplane) that includes display driver ICs). In an embodiment of the present disclosure, the display may be separate from the display driver circuitry and/or software (e.g., display driver ICs) and electrically coupled to the display device, for example, via a flex cable, wire, or electrical connector element. The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

The present disclosure is illustrated and described herein with reference to the various drawings, in which like reference numbers are used to denote like system components, as appropriate, and in which:

FIG. 1b illustrates a microLED display system incorporating the system of FIG. 1a.

FIG. 1c illustrates a LCOS display system incorporating the system of FIG. 1a.

DETAILED DESCRIPTION OF THE DISCLOSURE

Figure 1A:
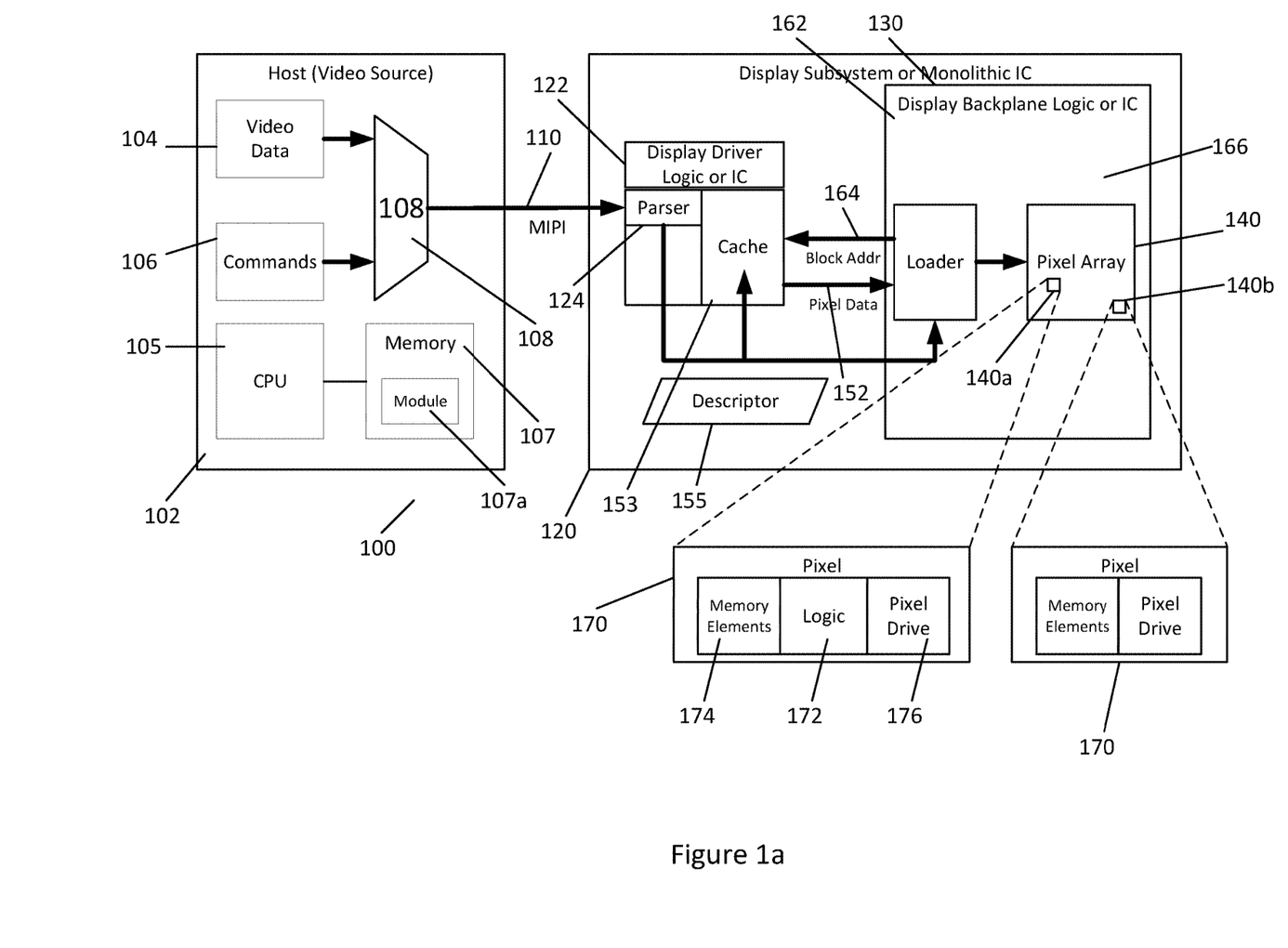
FIG. 1a illustrates a block diagram of a system and its components in accordance with the present disclosure.

FIG. 1a shows an illustrative block diagram of a data source 102, for example, an image, image data or video source or video data 104, such as a host. In an embodiment of the present disclosure, the host may include a processor 105, for example, an application processor, that executes applications, instructions, or commands 106 (e.g., software) stored in a storage device (for example, a memory device 107) of the host. In an embodiment of the present disclosure, the host may stream image data or images, for example video data via, for example, a Central Processing unit, Graphics Processing Unit, Display Processing Unit, DMA Engine, MIPI DSI Controller and MIPI PHY interface coupled to or included in the host. In an embodiment of the present disclosure software module 107a includes commands 106.

Figure 1B:
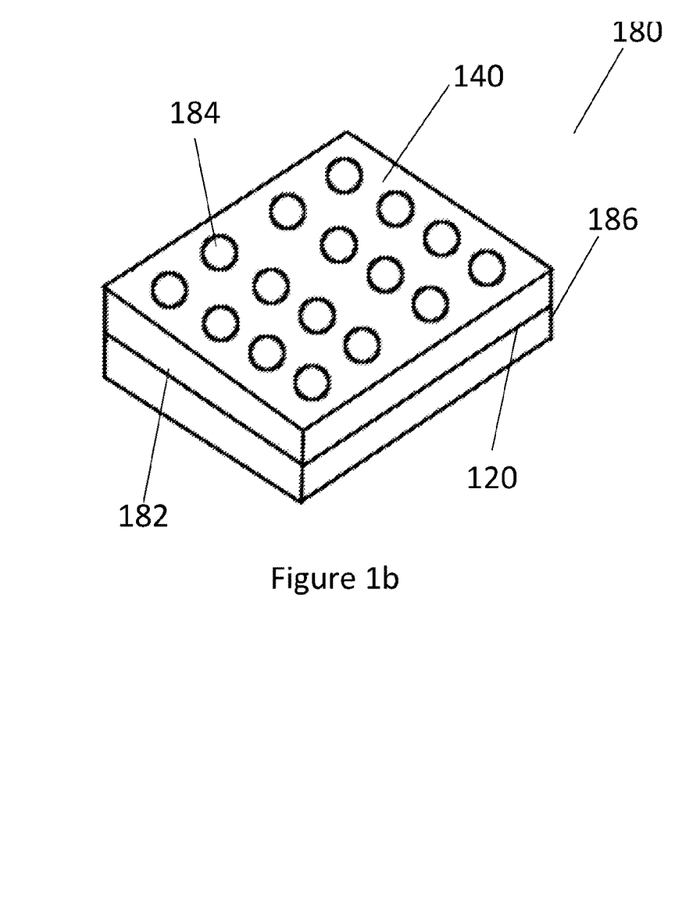

FIG. 1b is an illustration of a microLED display system 180 which, in an embodiment, may include the display system 100 of an embodiment of the present disclosure. MicroLED display systems 180 typically include a pixel array 140 of individual pixel LED elements 184 arranged on a substrate 182. In an embodiment of the present disclosure, the substrate 182 may be coupled to, integrated with or formed on a driver backplane or backplane IC 186. In an embodiment of the present disclosure the pixel LED elements are arranged directly on driver backplane or backplane IC 186. In an embodiment of the present disclosure the driver backplane or backplane IC 186 includes circuitry to drive the pixel array 140, for example, a display driver logic 122 or integrated circuit and/or a display backplane logic 130 or integrated circuit. The display driver logic 122 may include a parser 124 and/or a cache or storage device 153. The display backplane logic 130 may include a loader 162. A descriptor 152 may also be provided. The pixel drive circuitry 170 of the pixels of the pixel array 140 may also be provided.

Figure 1C:
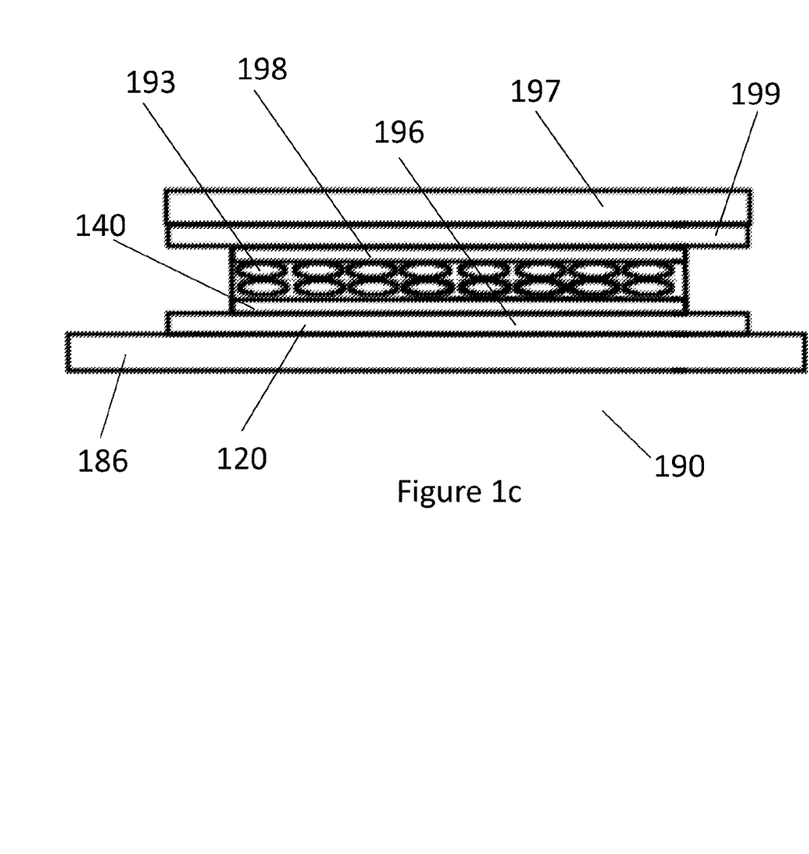

Similarly, FIG. 1c is an illustration of a LCOS display system 190 having similar elements and which, in an embodiment, may also include the display system 100 of the present disclosure. In particular, an LCOS display device includes a substrate 120 on which a display backplane or display drive backplane IC 186 may be coupled to or integrated with. The substrate 120 be silicon. A layer 196 of individual reflective devices, which may be individual reflective devices such as mirrors or aluminum devices (represented here as a single layer) that are arranged, coupled to, or integrated with the display backplane 120. An alignment layer 140 is formed on top of the layer 196. A liquid crystal layer 193, alignment layer 198, transparent electrode (typically within an Indium Tin Oxide layer) 199 and a glass or other transparent material layer 197 forming also form the structure of the display.

In an embodiment of the present disclosure, a display backplane IC 130 may be included in, incorporated into, or integrated into a display backplane 120 (which may be coupled to, for example, reflective devices 186; 196 in the LCOS display system or LEDs such as microLEDs in a microLED display system). The pixel array (i.e., the microLEDs or LEDs) can be on its own substrate, with each LED coupled to a pixel driver on the backplane. In an embodiment of the present disclosure, the display backplane 120 is coupled to a display device 180, 190 (e.g., an LCOS device) or LCOS pixel array 140 or pixel elements (e.g., reflective devices 186; 196 or LEDs or array of LEDs, for example, microLEDs). In an embodiment of the present disclosure, a display device 100 includes a display backplane 120, display backplane circuitry 130, pixel circuitry 174 (e.g., as pixel drive circuitry or pixel circuit), and pixel elements 140a that are coupled (e.g., electrically) to, integrated into, included in and/or positioned in the DDIC 122. In an embodiment of the present disclosure, a display device 100 (including the DDIC 122) is electrically coupled to a DDIC, and form the display subsystem 120 and are assembled together in a display module 100.

In an embodiment of the present disclosure the display subsystem 120 includes a display 197. In an embodiment of the present disclosure (such as shown in FIG. 1c), the display 197 is an array of pixel elements 140 arranged on the backplane 120 or coupled to backplane circuitry (e.g., pixel circuitry 170, pixel drive circuitry or drive circuitry incorporated, coupled to, or integrated into the backplane). In an embodiment of the present disclosure the display subsystem 120 is a liquid crystal-on-silicon (LCoS) display subsystem of an LCoS display system 190. In an embodiment of an LCoS system 190, in accordance with an embodiment of the present disclosure, the display 197 is a liquid crystal display or liquid crystal cell (including liquid crystal 193 placed between two substrates 196, 199, is electrically coupled to or integrated with a backplane 120 or backplane IC of the display subsystem. In an embodiment of the present disclosure, one of the substrates 196 of the liquid crystal display or cell is the backplane 120 or backplane IC. In an embodiment of the present disclosure, the liquid crystal display or liquid crystal cell 193 is included, electrically coupled to, or integrated into Display Backplane integrated circuit 130 (IC) or substrate thereof. In an embodiment of the present disclosure, the Display Backplane IC 130 is electrically coupled to one of the sides of the Liquid Crystal cell, for example, a side of the display that does not emit light or the light that corresponds to an image. In an embodiment of the present disclosure, the liquid crystal cell is coupled to a silicon substrate 182, and that substrate is the same silicon substrate that forms one side of the Display Backplane IC 120 or is a silicon substrate coupled to a substrate of the Display Backplane IC (e.g., a substrate, such as a silicon substrate that includes drive circuitry, pixel circuitry, pixel circuits 170, and/or drive circuits 166).

In an embodiment of the present disclosure (such as shown in FIG. 1*b*), the display subsystem 120 is a micro-LED display subsystem 180. In an embodiment of the present disclosure the display subsystem 100 is of a micro-LED system 180. In an embodiment of a micro-LED subsystem 180 in accordance with embodiments of the present disclosure, the display is an array of LEDs 184 or microLEDS that is electrically coupled to or integrated into or with a backplane 120 or display backplane IC of the display subsystem 100. In an embodiment of the present invention, the array of microLEDs 184 is included, electrically coupled to, or integrated into the Display Backplane integrated circuit (IC) 122 and/or substrate thereof 182. In an embodiment of the present disclosure, the Display Backplane IC 122 is electrically coupled to one of the sides of the array of LEDs (e.g., microLEDs), for example, a side of the array of LEDs (e.g., microLEDs) that does not emit light or the light that corresponds to an image. In an embodiment of the present disclosure, the array of LEDs 184 (e.g., microLEDs) is coupled to a silicon substrate 182, and that substrate is the same silicon substrate that forms one side of the Display Backplane IC 122 or is a silicon substrate 182 coupled to a substrate 186 of the Display Backplane IC 122 (e.g., a silicon substrate of the Display Backplane IC).

In an embodiment of the present disclosure, the array of pixels 184 include pixel elements assembled in an array 140, or assembled on a substrate 182 in an array. In an embodiment of the present disclosure, the array of pixels 180 is an array of light emitting diodes (LEDs). In an embodiment of the present disclosure the LEDs may be microLEDs. In an embodiment of the present disclosure, the array of pixel elements 184; 140 is an array of reflective elements 196 that control the birefringence of the liquid crystal 193 in an LCoS device 190 or other liquid crystal device. In an embodiment of the present disclosure, the pixel elements 184 are reflective elements/devices, for example, mirrors. In an embodiment of the present disclosure, the pixel array 140 or array of pixels is formed in, coupled to, incorporated in, or integrated into the display backplane IC 122. In an embodiment of the present disclosure, the DDIC or display driver circuitry drives the operation of pixel elements (e.g., light emitting diodes (LEDs), microLEDs 184, reflective elements) of an array of pixel elements arranged on a backplane 120 of the display subsystem 100.

In an embodiment of the present disclosure, the data source or host may be, for example, a mobile device, such as smartphone, tablet, laptop, head-up display system, head mounted device, or hybrid device (or some combination of the aforementioned). In an embodiment of the present disclosure, the image, image data, and/or video data is received by the real time data software module 107*a* and/or a MUX 108 of the host 102, and the real time data software or software module 107*a* combines the data with the commands parsed from a master sequence file containing a desired drive sequence at the multiplexer (MUX) 108 and/or real time data software module 107*a*. Additionally or alternatively the MUX 108 could be hardware that is controlled from the real-time data software module 107*a*. In an embodiment of the present disclosure, the data combined with the commands is combined data that is output from the data source (e.g., the host) 102 and transmitted to the display subsystem. In an embodiment of the present disclosure the combined data is output via a real time data software module 107*a* and/or MUX 108 of the data source 102.

In contrast to known systems, the data source or host 102 of the embodiments herein renders and transmits the part of the data 104 between frames that has changed, and not all of the image data (i.e., the changed and the unchanged data). In an embodiment of the present disclosure, the only image data transmitted by the host is the part of the data that has changed between frames, and this changed image data is transmitted from the host 102 to the display 197 or display backplane 130 and/or the driver circuitry 122 and/or software for driving the display backplane 130, along with one or more commands 106. This savings may occur at five stages as will be described in greater detail below: 1) transporting the data from the host 102 to the display 197; 2) putting it into a cache 153, 3) reading it from the cache 153, 4) writing it from the cache 153 into the display 130 via a display loader 162, and 5) modulating the active pixels of the display 197. Embodiments of the disclosure take advantage of the nature of images being presented in system applications, such as AR systems, which generally have sparse image data (as the image is overlaid on the real world) with a high proportion of black background which becomes transparent in an AR head-mounted display. In accordance with embodiments of the present disclosure, there may be instances when the whole display area and full data bandwidth over cables transporting the data to the display may need to be refreshed, for example, when a full-motion video is being presented or when a user is moving and graphics are being updated to align with the user's real world vantage point. In embodiments of the present disclosure, the display 197 may be showing icons, graphics or text in certain areas (such as ribbons along the bottom edge, top edge or side edges of the display, while the center area is blank) and these may be static or changing sporadically, and in these types of circumstances, transmitting the part of the data between frames that has changed, in accordance with embodiments of the present disclosure, and not the all of the image data (i.e., the changed and the unchanged data) is advantageous, as it for example, saves power. The data 104 may also be a symbol, icon or indicator which is moving, but is small relative to the entire display area and thus only a subset of the area needs to be updated, in accordance with an embodiment of the present disclosure. For small-area refresh cases, the refresh rate may also be increased if the motion needs to be rapid to keep up with changes to the environment, because the available time and transport bandwidth may be fully devoted to the changing portion of the display. Embodiments of the disclosure address the minimization of data processing, transport and refresh at multiple stages of the pipeline. In one embodiment, the entire display is refreshed without refreshing the whole cache, and in another embodiment, the whole display is refreshed from the cache. In an embodiment of the present disclosure, the loader 162 may only extract or read the changed data from the cache 153, and refresh or update the display 197. Alternatively, for example, the loader 162 may refresh or update the display 197 utilizing or reading the entire contents or image data in the cache 153 to update or refresh the display 197, as opposed to just reading the changed data from the cache 153.

Figure 3:
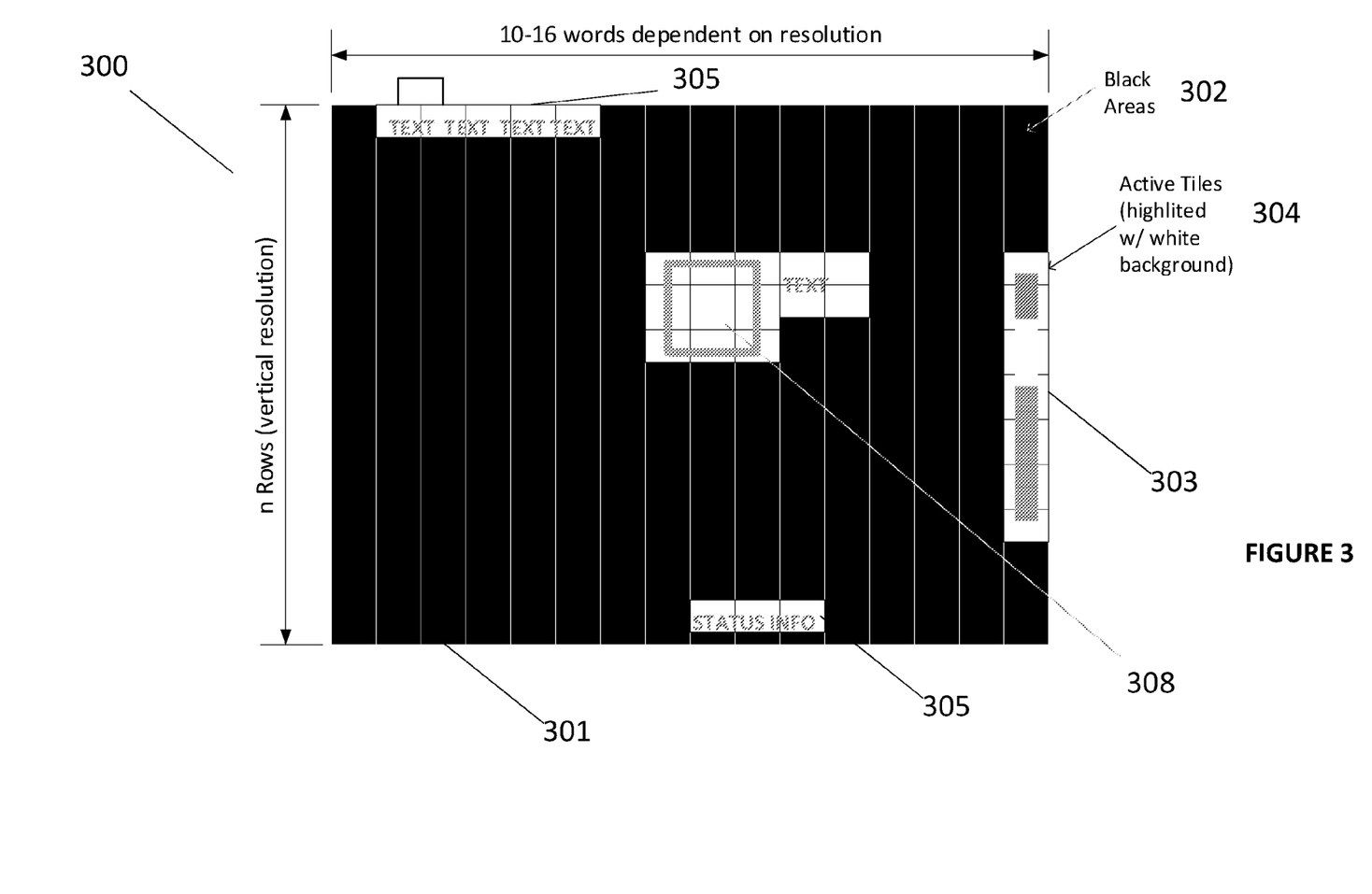
FIG. 3 is an illustration of an image partitioned into active and non-active areas in accordance with embodiments of the present disclosure.

The display backplane portion 130 of the display subsystem 120 according to embodiments of the disclosure incorporates the ability to only reload data into a portion of the display while leaving the state of all other pixels 140 static. This is shown in FIG. 3, and is achieved by making the display 300 load its pixels by addressing small rectangular blocks 308 of pixels or subsets of the display's pixels 140a, 140b, or collections of blocks of pixels or subsets of the display's pixels, by having a column-oriented load enable signals, or control voltages that enable or disable, for each group of columns 301 defining the horizontal range of columns in the block 308 that works in conjunction with the row-oriented load signals, or control voltages, to enable or disable loading new data into pixels within the blocks of pixels 308. In an embodiment of the present disclosure, the pixel 140a incorporates enough memory 174 (for example, pixel circuitry 170 such as latches or latch circuitry) to fully describe the grayscale value of that pixel, and retains the state of a static (non-changing) pixel 140a from frame to frame.

Turning to FIG. 1a again, a software application on a host 102 (i.e., a host that is a source of image data, for example, images, video, image data and/or video data 104) renders image data (e.g., within a frame buffer) for a portion (or all) of the image which needs to change on the display 197. In an embodiment of the present disclosure, the image data is formatted. In embodiments of the present disclosure, the image data is formatted by combining, appending, or integrating, such image data with commands 106 (e.g., a descriptor or an image descriptor that indicates size and position(s) about the image data to be changed) and delivers it as if it were pure video data 104 (i.e., without any indication that it includes commands 106 or command data to the lower layers of a transport protocol 110 (such as MIPI). In embodiments of the present disclosure, the commands 106 may not be subsequently processed after transmission until they are parsed from the transmitted data or image data by the parser 124.

In an embodiment of the present disclosure, which pixels and/or blocks of pixels are to be re-loaded (i.e., the changed data) are identified using a command 106, such as a descriptor (e.g., an area descriptor) and this changed data may be transmitted (along with new image and/or video data 104) by the host 102 over the transport channel device 110 to display subsystem 120 and/or the display loader logic 162 (i.e., loader circuitry and/or software). The transport channel (e.g., cable, physical layer electronics and higher layers of the transport protocol) 110 can remain standardized for interoperability, however the content of the data stream is altered to contain both commands 106 and image and/or video data 104 masquerading as image and/or video data 104 (i.e., pure image and/or video data 104 or data that is not recognized for the commands 106 that it includes). Embodiments of software on the host 102 and a parser 124 in the display driver logic 122 (or separate display driver IC) agree or operate in accordance with a format for both image/video data packets and commands 106 (i.e., a same format or compatible format), such as the block descriptor 155 that provides the size and location of the area being refreshed, and the refresh rate of the system 100. In an embodiment of the present disclosure, the host 102 and the parser 124 are designed to agree. In an embodiment of the present disclosure the parser 124 may be hardware and/or software.

In the display subsystem 120 (or monolithic display IC), the received data stream 110 is parsed by the parser 124 to extract the image data 152 (e.g., block of image or video data 104) and the command(s) 106 or identifier(s) (e.g., the descriptor 155) that accompany it. In an embodiment of the present disclosure, the descriptor 155 is used to identify where in a local cache 153 the new data 104 will be stored. In an embodiment of the present disclosure, the descriptor 155 gets sent to both the cache 153 and the loader 162 so that the driver logic (i.e., driver circuitry 122 and/or software) knows where to put the changed data and so that the loader 162 knows where, in the cache 153, to read the changed data from when it needs to write it to the pixel array 140. In an embodiment of the present disclosure, the cache 153 (which may precede the display loader 162), is used to stage or store the image and/or video data 104 prior to the image and/or video data 104 being loaded onto the display 197. In an embodiment of the present disclosure, the only portions, sections, or addresses of the cache 153 that are updated are those portions of its contents corresponding to or related to the display area(s) being updated, as identified or set by the descriptor 155 (e.g., the area descriptor). In some embodiments only portions of the entire scheme are used. For example, in an embodiment, the host 102 can identify an area of a display 197 to be updated and send only the data for that area, and the cache 153 will be re-written, but the display 197 can be set to refresh from the cache 153 if, for instance, a multi-color display needs to display data from 3 separate colors sequentially (color sequential operation).

In an embodiment of the disclosure, the parser 124 sends the descriptor 155 to the cache 153 and also to the loader 162, and the loader uses the descriptor to identify a block address 164 from where to read or fetch the changed data from in the cache 153 (such that the loader 162 can load the changed data into the pixel array 140) and then uses the descriptor 155 to identify the rows 303 and columns 301 in the array 140, 300 to load that data (e.g., image data) into. In an embodiment of the present disclosure the descriptor 155 may be queued (i.e., placed in a buffer memory in the same order as the order of regions that will be updated on a display or the pixel array or pixel elements of a display 197) for when the loader 162 will extract the data from the cache 153 to load into the display pixels 140. The queueing may occur at predetermined intervals. In an embodiment of the present disclosure, there may be a fixed refresh rate, where all the data that will be displayed in the next frame time arrives at the cache 153 for updating of the display 197 in accordance with the refresh rate. In contrast, a system 100 in accordance with embodiments of the present disclosure, may periodically update the display 197 or array of pixels or pixel elements of a display 197 at predetermined intervals (and the timing of such intervals may vary). Alternatively, in an embodiment of the present invention, a system 100 in accordance with embodiments of the present disclosure may push out the changed data as it received by the display driver logic (i.e., the display driver circuitry 122 and/or software and/or the parser 124).

In another embodiment of the disclosure the host processor 105 only renders the portion of the image that is active or changing into a video buffer, but for convenience, the entire video buffer is transmitted to the display 197 and the display driver logic 122 computes an occupancy map 300 for areas of the display, such as rectangular tiles 308 or portions of lines 303, based on whether or not there are any non-black pixels in each area 308. This is shown in FIG. 3. This occupancy map 300 can replace the descriptor 152 of occupied and changed areas sent from the host 102. Only data 303, 305, 308 that is non-black is written into cache 153, and only areas that are marked as active 304 in the occupancy map are retrieved from cache 153 and only areas 304 that are marked active are written to the display pixel memories 174. In an embodiment of the present disclosure, the occupancy map 300 is a collection of data and may be accessed by display driver software and/or circuitry/hardware. The occupancy map 300 may, in an embodiment, determine areas that are active 304 (i.e., active areas) by analyzing whether or not there are any non-black pixels in areas of the display 197.

By utilizing the systems and methods of the embodiments herein, power consumption is saved by only rendering, transporting and refreshing data for portions of the display that need to change while leaving other portions untouched rather than sending complete video frame. This also yields higher frame rates over conventional systems and methods.

In one embodiment, each pixel 140a, 140b within the pixel array 140 includes memory elements 174 (e.g., latches), logic 172 (e.g., hardware such as combinational gates, transistors etc.) and pixel drive circuitry 176 (such as a level shifter). Alternatively, one or more of each of the pixels 140b may include only the memory elements 174 and pixel drive logic 172. This is illustrated in FIG. 1 by the exploded view of the two alternative pixel blocks 140a, 140b. The pixels themselves incorporate sufficient memory 174 to fully describe the grayscale value of that pixel, which then enables the pixel value to remain static with no load activity if the image is not changing. In other words, there is enough memory 174 to store information in the pixel 140a, 140b so that it retains the correct color or brightness from frame to frame without being refreshed. Logic 172 in the pixel 140a, 140b serves to decode the stored grayscale value and modulate the pixel driver output 176 (for instance setting an analog value, or a series of binary values over the course of a frame that give a desired light intensity). In an embodiment of the present disclosure the memory elements 174 may be latches or latch circuitry that store image data represented by a number of bits.

The pixel logic 172 may incorporate information received from the G-bus and determines which waveform goes out to the pixel array 140 based on the image data. See e.g., FIGS. 10-11 of the PCT document PCT/US2021/012262 entitled "Dynamic Pixel Modulation", the entirety of which is fully incorporated herewith as part of this disclosure.

Figure 2:
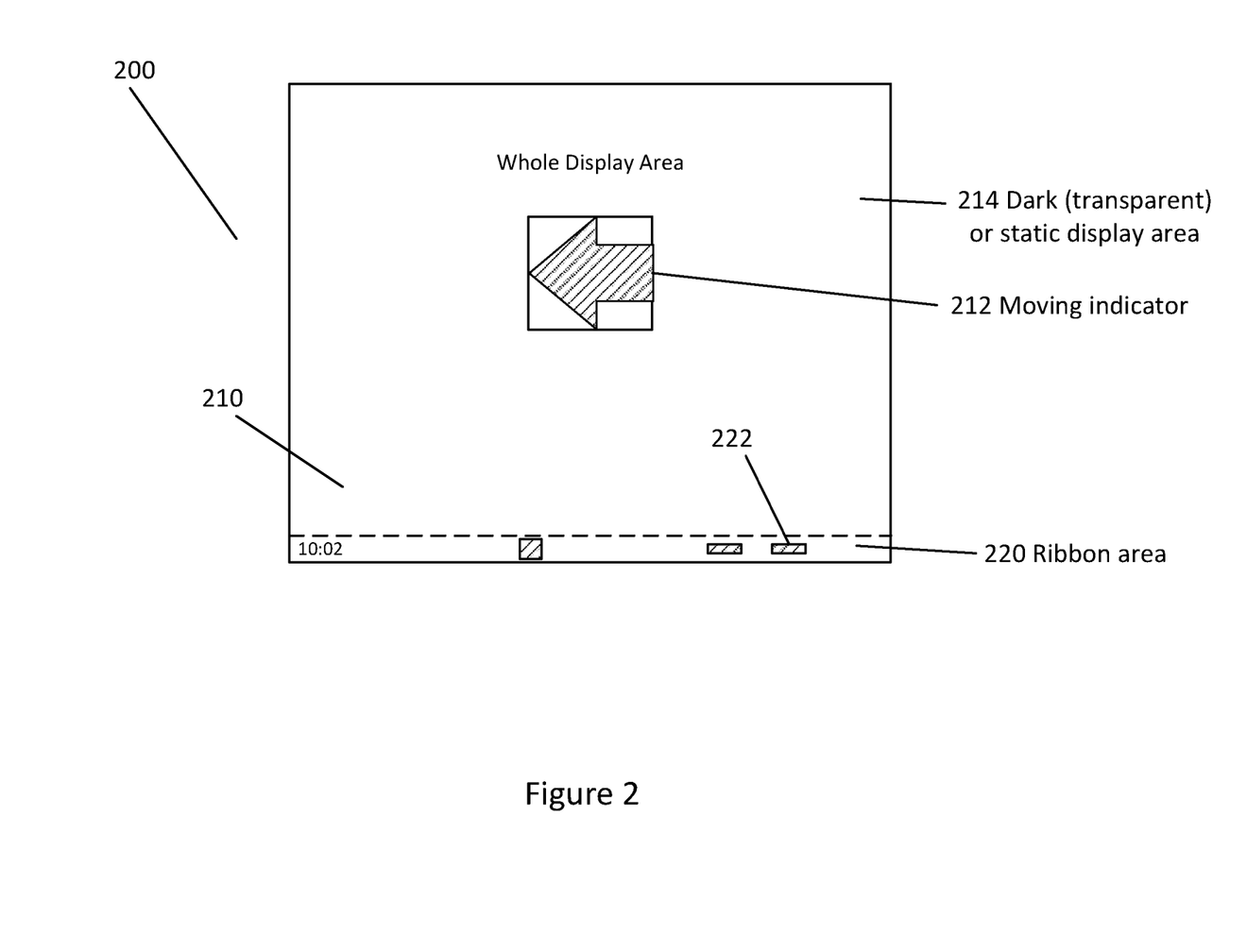
FIG. 2 is an illustration of an exemplary image displayed in accordance with embodiments of the present disclosure.

FIG. 2 illustrates a display area 200 according to embodiments herein as would be viewed in an exemplary, and non-limiting system application, namely, an AR head-mounted display. (An alternative may be a display for an HUD for a vehicle.) In an embodiment of the present disclosure, FIG. 2 illustrates an image 210 that is overlaid onto the real world seen by a user of a device, for example, an AR head-mounted device. In the example of FIG. 2, because the viewer is seeing the real world with information superimposed, the majority 214 of the image 210 is clear (no light being reflected to the eye from the display) and does not need to be updated. A moving indicator/symbol 212 occupies a small area that is moving and needs to respond to external motion of the wearer in their environment. A ribbon area 220 is shown, having a fixed location in the image 210, and its content only needs to be updated as needed (as frequently as required). For example, the update may occur once per second for the clock and very slowly for the battery indicator 222. In an embodiment of the present disclosure, the system 100 in accordance with embodiments of the present disclosure would be efficient when used to display changes to an image that is overlaid onto what a viewer sees in the real world, as the system would only update the portions of the overlay image that change, for example, the moving indicator arrow or FIG. 2.

FIG. 3 illustrates an exemplary sparse image 300, subdivided into fixed-size regions 302, 303, 305, 307, 308 that have either been marked active 304 (containing non-black image data) or inactive 302. For illustrative purposes, the background of regions that contain non-black pixels is shown in white. The occupancy map 300 marks the active regions as such, and only the data for those areas would be stored into cache 153, retrieved from cache 153 and loaded into each pixel's memory 174.

Figure 4:
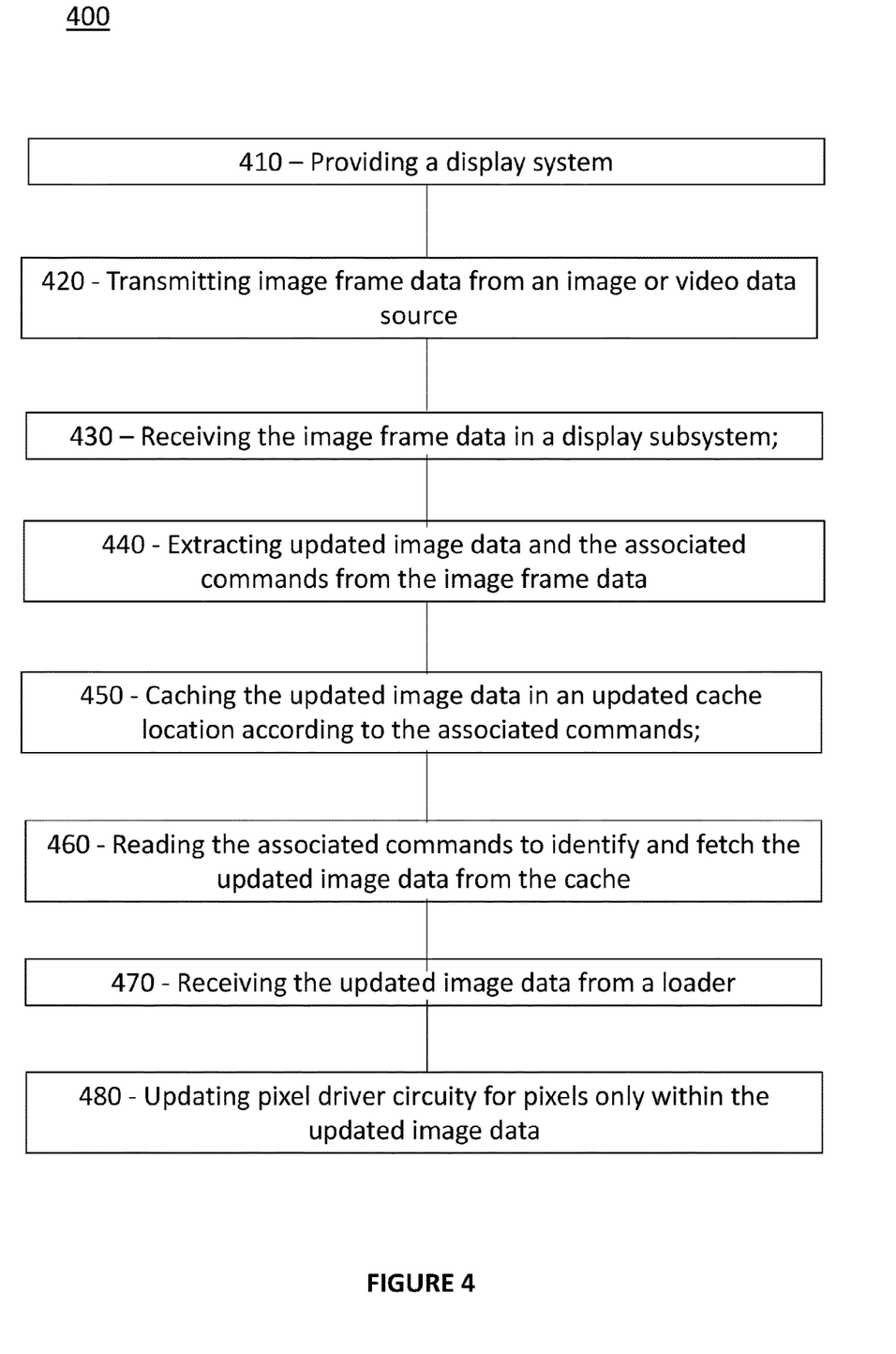
FIG. 4 illustrates a method in accordance with embodiments of the present disclosure.

A method 400 of operation of a display system 100, in accordance with embodiments of the present disclosure, is described as illustrated in FIG. 4. The method may involve, in an embodiment of a method of operating a display system, a step of providing 410 a display system 100. In accordance with an embodiment of the present disclosure, a subsequent step 420 may include transmitting image frame data from an image or video data source 120, wherein said image frame data comprises: updated image data 104 of at least a portion of an image 210 to replace a corresponding portion of image data of a currently displayed image 210. Associated commands 106 (e.g., commands to update aspects of a display drive sequence, such as timing parameters) provide descriptors for regions and/or describe how the updated image data replaces the image data. After being rendered by a source 120 in a manner as described previously, the method may include the step of receiving 430 the image frame data in a display subsystem 120. The image frame data may be received and parsed by a parser 124 that extracts in step 440 the updated image data 104 and the associated commands 106 from the image frame data and stores the updated image data 104 in the storage or cache 153. The contents of the storage or cache 153 (e.g., the updated image data 104) may then be transmitted to the loader in step 450 in accordance with the associated commands 106. A loader 162 may then read 460 the associated commands 106 to identify and fetch the updated image data 104 from the cache 253; and subsequently a pixel array 140 receives 470 the updated image data 104 from a loader 162; and updates in step 480 pixel driver circuity for pixels only within the updated image data.

The subject matter described herein can be implemented in digital electronic circuitry, or in computer software, firmware, and/or hardware, including the structural means disclosed in this specification and structural equivalents thereof, or in combinations of them. The subject matter described herein can be implemented as hardware, one or more computer program products, such as one or more computer programs tangibly embodied in an information carrier (e.g., in a machine readable storage device), and/or embodied in a propagated signal (e.g., a voltage or current waveform), for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

The subject matter described herein can be implemented in a computing system that includes a back end component (e.g., a data server), a middleware component (e.g., an application server), or a front end component (e.g., a client computer mobile device, wearable device, having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A display system for updating an image displayed on a display device, said display device comprising pixels in a pixel array, said system comprising:
    a parser for receiving image frame data, wherein the parser extracts updated image data and commands including commands that identify portions of the display for updating;
    a map consisting of a collection of data, wherein the collection of data includes at least one of coordinates or block locations of active areas of the display for updating, the active areas of the display being determined by analyzing whether or not there are any non-black pixels in areas of the display;
    a storage device for storing the updated image data based on at least one of the commands or the map;
    a loader for reading the commands, wherein the loader identifies the updated image data, and fetches the updated image data corresponding to the active areas of the display from the storage in accordance with the map; and
    display backplane circuitry for receiving the updated image data corresponding to the active areas of the display from the loader and for updating pixel driver circuity that updates the pixels with the updated image data corresponding to the active areas of the display.

2. The system of claim 1, wherein said commands comprise a descriptor identifying which location of a corresponding portion of the image the updated image data shows.

3. The system of claim 2, wherein the parser at least one of sends the commands to the storage device or the loader.

4. The system of claim 2, wherein the loader reads the descriptor and fetches the updated image data from the updated storage location.

5. The system of claim 4, wherein the loader identifies one or more of pixel rows and columns in the pixel array corresponding to the location in the descriptor.

6. The system of claim 5, wherein the loader queues reading of the descriptor until the loader fetches data from the storage device.

7. The system of claim 5, wherein the loader queues reading of the descriptor to occur at predetermined intervals.

8. The system of claim 1, further comprising an image source, and wherein the image source identifies the location of the display to be updated, and renders updated image data only for the location.

9. The system of claim 8, wherein the image source is a video data source, and wherein the updated image data is stored in at least one of a memory or a buffer.

10. The system of claim 9, wherein the at least one of a memory or a buffer is a buffer and the updated image data stored in the buffer is transmitted to the display system, and wherein the display system comprises driver display logic for computing an occupancy map of active areas of the display from the updated image data.

11. The system of claim 10, wherein the areas of the display comprise rectangular tiles of at least one of pixels, rows of pixels, or portions of the pixels of the display.

12. The system of claim 1, wherein only data that is non-black is written into the storage device.

13. The system of claim 1, wherein the display system comprises an array of pixels, and each pixel within the pixel array comprises:
 pixel elements coupled to pixel logic circuitry; and
 pixel memory coupled to the pixel logic circuitry.

14. The system of claim 13, wherein the storage device includes storage elements to store a current grayscale value of the pixel.

15. The system of claim 14, wherein each of the pixels further comprises pixel drive circuitry.

16. The system of claim 15, wherein the pixel logic circuitry decodes the current grayscale value and modulates the pixel drive circuitry, and generates at least one of a pixel intensity or brightness.

17. The system of claim 16, wherein each of the memory elements comprises latch circuity to store image data represented by a number of bits, for the pixel.

18. The system of claim 1, further comprising an image source, wherein said image source at least one of renders or transmits said image frame data, the image frame data comprising:
 updated image data of at least a portion of an image to replace a corresponding portion of image data of a currently displayed image; and
 associated commands describing how the updated image data replaces the image data.

19. The system of claim 1, wherein the storage device is a cache memory.

20. A method of updating an image displayed on a display device, said display device comprising pixels in a pixel array, said method comprising:
 receiving image frame data in a display subsystem;
 receiving the image frame data in a parser;
 extracting updated image data and associated commands from the image frame data, said image frame data comprising commands instructing a loader how to update the display;
 computing a map consisting of a collection of data, wherein the collection of data includes at least one of coordinates or block locations of active areas of the display for updating, the active areas of the display being determined by analyzing whether or not there are any non-black pixels in areas of the display;
 storing the updated image data in an updated cache location according to the commands;
 reading the commands to identify and fetch the updated image data corresponding to the active areas of the display from the updated cache location;
 receiving the updated image data corresponding to the active areas of the display from the loader; and
 updating pixel driver circuity for pixels only within the updated image data corresponding to the active areas of the display.

* * * * *